(12) United States Patent
Bamba et al.

(10) Patent No.: US 12,358,325 B2
(45) Date of Patent: Jul. 15, 2025

(54) TIRE

(71) Applicant: Sumitomo Rubber Industries, Ltd., Kobe (JP)

(72) Inventors: Nozomi Bamba, Kobe (JP); Shotaro Abe, Kobe (JP); Ryuhei Sanae, Kobe (JP); Sho Nakajima, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 267 days.

(21) Appl. No.: 18/110,027

(22) Filed: Feb. 15, 2023

(65) Prior Publication Data

US 2023/0286324 A1    Sep. 14, 2023

(30) Foreign Application Priority Data

Mar. 14, 2022 (JP) ................. 2022-039482

(51) Int. Cl.
 *B60C 11/12* (2006.01)
 *B60C 11/03* (2006.01)

(52) U.S. Cl.
 CPC ...... *B60C 11/1281* (2013.01); *B60C 11/0302* (2013.01); *B60C 11/0304* (2013.01); *B60C 11/1236* (2013.01)

(58) Field of Classification Search
 CPC ........... B60C 11/1272; B60C 11/1281; B60C 2011/039; B60C 2011/0388; B60C 11/0304; B60C 11/1263
 See application file for complete search history.

(56) References Cited

U.S. PATENT DOCUMENTS

| | | | |
|---|---|---|---|
| 2017/0015143 A1 | 1/2017 | Nagase | |
| 2018/0009269 A1 | 1/2018 | Kawagoe et al. | |
| 2018/0162171 A1* | 6/2018 | Colletti | B60C 11/0306 |
| 2019/0351714 A1* | 11/2019 | Miyazaki | B60C 11/1392 |
| 2019/0375244 A1 | 12/2019 | Kubo | |

FOREIGN PATENT DOCUMENTS

| | | | | |
|---|---|---|---|---|
| JP | 2005075213 A | * | 3/2005 | |
| JP | 2021104746 A | * | 7/2021 | B60C 11/03 |

OTHER PUBLICATIONS

JP-2005075213-A machine translation (Year: 2005).*
JP 2021104746-A machine translation (Year: 2021).*
Extended European Search Report for European Application No. 23155119.3, dated Jul. 14, 2023.

* cited by examiner

*Primary Examiner* — Blaine Copenheaver
*Assistant Examiner* — Wendy L Boss
(74) *Attorney, Agent, or Firm* — Birch, Stewart, Kolasch & Birch, LLP

(57) ABSTRACT

A tire has a tread portion including a first shoulder land region. The first shoulder land region is provided with first shoulder sipes. Each of the first shoulder sipes is provided with a chamfered portion over an entire lengthwise range from a first longitudinal edge to a first tread edge. Each of the chamfered portions includes a first chamfered portion defined between a shoulder center position and the first longitudinal edge and a second chamfered portion defined between the shoulder center position and the first tread edge. The second chamfered portion has a chamfer volume smaller than a chamfer volume of the first chamfered portion.

19 Claims, 8 Drawing Sheets

TIRE

RELATED APPLICATIONS

This application claims the benefit of foreign priority to Japanese Patent Applications No. JP2022-039482, filed Mar. 14, 2022, which are incorporated by reference in its entirety.

FIELD OF THE INVENTION

The present disclosure relates to a tire.

BACKGROUND OF THE INVENTION

Japanese Unexamined Patent Application No. 2021-104746 (Patent Literature 1) has proposed a tire having a shoulder land region provided with a plurality of shoulder sipes.

SUMMARY OF THE INVENTION

Further improvement in cornering performance has been demanded of tires provided with shoulder sipes as the one disclosed in Patent Literature 1 above. On the other hand, in recent years, vehicles have become noticeably quieter, and it is necessary to give due consideration to noise performance of tires.

The present disclosure was made in view of the above, and a primary object thereof is to provide a tire with improved cornering performance while suppressing deterioration of the noise performance.

The present disclosure is a tire having a tread portion including a first tread edge, a plurality of circumferential grooves extending continuously in a tire circumferential direction, and a first shoulder land region, wherein
- the circumferential grooves include a first shoulder circumferential groove extending continuously in the tire circumferential direction closest to the first tread edge among the circumferential grooves,
- the first shoulder land region is demarcated outside the first shoulder circumferential groove in a tire axial direction and includes a first longitudinal edge located on the first shoulder circumferential groove side and a shoulder center position,
- the shoulder center position is a center position in the tire axial direction between the first longitudinal edge and the first tread edge,
- the first shoulder land region is provided with a plurality of first shoulder sipes extending from the first longitudinal edge to at least the first tread edge,
- each of the first shoulder sipes is provided with a chamfered portion in an entire lengthwise range from the first longitudinal edge to the first tread edge,
- each of the chamfered portions includes a first chamfered portion defined between the shoulder center position and the first longitudinal edge and a second chamfered portion defined between the shoulder center position and the first tread edge, and
- the second chamfered portion has a chamfer volume (V2) smaller than a chamfer volume (V1) of the first chamfered portion.

By adopting the above configuration, it is possible that the tire of the present disclosure improves the cornering performance while suppressing the deterioration of the noise performance.

DETAILED DESCRIPTION OF THE INVENTION

Figure 1:
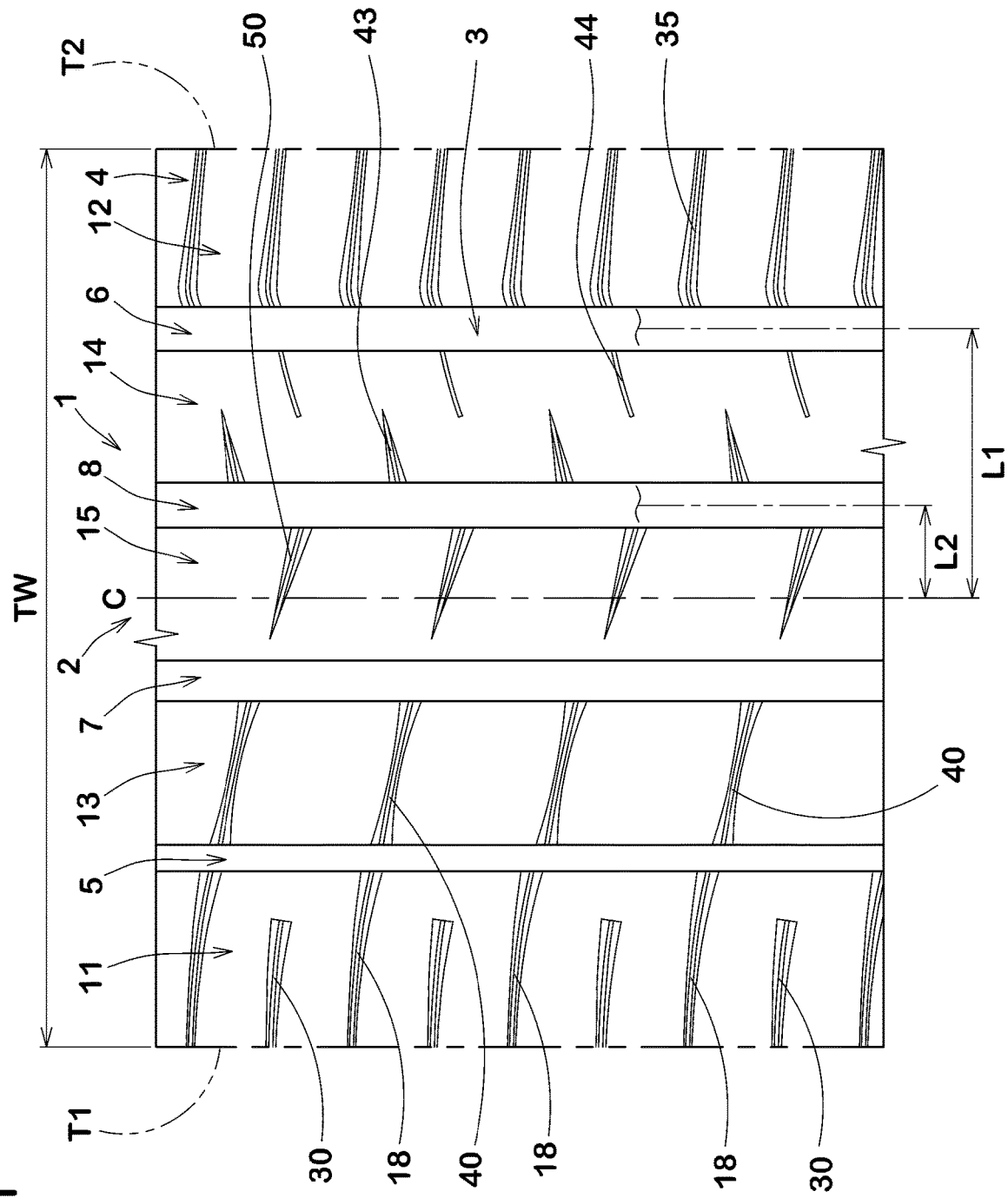
FIG. 1 is a developed view of a tread portion of a tire according to an embodiment of the present disclosure.

An embodiment of the present disclosure will now be described below in conjunction with accompanying drawings. FIG. 1 is a developed view of a tread portion 2 of a tire 1 of the present embodiment. As shown in FIG. 1, the tire 1 of the present embodiment is suitable for use as a pneumatic tire for passenger cars, for example. However, the present disclosure is not limited to such an aspect, and may be applied to heavy-duty pneumatic tires and non-pneumatic tires that are not filled with pressurized air.

As shown in FIG. 1, the tire 1 of the present disclosure has a tread portion 2 of which position for mounting the tire on a vehicle is specified regarding inner and outer sides of the tread portion with respect to the vehicle. The tread portion 2 includes a first tread edge T1, which is on the outer side of the vehicle when the tire 1 is mounted on the vehicle, and a second tread edge T2, which is on the inner side of the vehicle when the tire 1 is mounted on the vehicle. The mounting position to the vehicle is indicated by characters or symbols on a sidewall portion (not shown), for example. However, the tire 1 of the present disclosure is not limited to such a manner.

The first tread edge T1 and the second tread edge T2 are the outermost ground contact positions in a tire axial direction of the tire 1 when the tire 1 in a standard state is in contact with a flat surface with zero camber angle by being loaded with 60% of a standard tire load.

The term "standard state" refers to a state in which the tire 1 is mounted on a standard rim (not shown), inflated to a standard inner pressure, and loaded with no tire load. In the case of tires for which various standards have not been established or non-pneumatic tires, the standard state means a standard state of use according to the purpose of use of the tire loaded with no tire load. In the present specification, unless otherwise specified, dimensions of various parts of the tire are values measured in the standard state. Further, in the present specification, unless otherwise noted, known methods can be applied as appropriate to measure the aforementioned dimensions and composition of materials.

The term "standard rim" refers to a wheel rim specified for the concerned tire by a standard included in a standardization system on which the tire is based, for example, the "normal wheel rim" in JATMA, "Design Rim" in TRA, and "Measuring Rim" in ETRTO.

The term "standard inner pressure" refers to air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

The term "standard tire load" refers to a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. For tires for which various standards have not been established, "standard tire load" refers to the maximum applicable load for the use of the tire according to the above-mentioned standards.

The tread portion 2 includes a plurality of circumferential grooves 3 extending continuously in a tire circumferential direction between the first tread edge T1 and the second tread edge T2, and a plurality of land regions 4 divided by the circumferential grooves 3. The tire 1 of the present embodiment is configured as a so-called five-rib tire where the tread portion 2 is divided by four circumferential grooves 3 into five land regions 4. However, the tire 1 of the present disclosure is not limited to such a mode, but may be configured, for example, as a so-called four-rib tire having the tread portion 2 divided into four land regions 4 by three circumferential grooves 3.

The circumferential grooves 3 include a first shoulder circumferential groove 5. The first shoulder circumferential groove 5 is arranged closest to the first tread edge T1 among the multiple circumferential grooves 3. In addition, the circumferential grooves 3 include a second shoulder circumferential groove 6, a first crown circumferential groove 7 and a second crown circumferential groove 8. The second shoulder circumferential groove 6 is arranged closest to the second tread edge T2 among the multiple circumferential grooves 3. The first crown circumferential groove 7 is arranged between the first shoulder circumferential groove 5 and a tire equator (C). The second crown circumferential groove 8 is arranged between the second shoulder circumferential groove 6 and the tire equator (C).

It is preferred that a distance L1 from the tire equator (C) to a groove centerline of the first shoulder circumferential groove 5 or the second shoulder circumferential groove 6 is 25% or more and 35% or less of a tread width TW. It is preferred that a distance L2 from the tire equator (C) to a groove centerline of the first crown circumferential groove 7 or the second crown circumferential groove 8 is 5% or more and 15% or less of the tread width TW. It should be noted that the tread width TW is the distance in the tire axial direction from the first tread edge T1 to the second tread edge T2 of the tire 1 in the standard state.

The land regions 4 of the present disclosure include a first shoulder land region 11. The first shoulder land region 11 is demarcated axially outside the first shoulder circumferential groove 5 and includes the first tread edge T1. In addition, the land regions 4 in the present embodiment include a second shoulder land region 12, a first middle land region 13, a second middle land region 14, and a crown land region 15. The second shoulder land region 12 is demarcated axially outside the second shoulder circumferential groove 6 and includes the second tread edge T2. The first middle land region 13 is demarcated between the first shoulder circumferential groove 5 and the first crown circumferential groove 7. The second middle land region 14 is demarcated between the second shoulder circumferential groove 6 and the second crown circumferential groove 8. The crown land region 15 is demarcated between the first crown circumferential groove 7 and the second crown circumferential groove 8.

Figure 2:
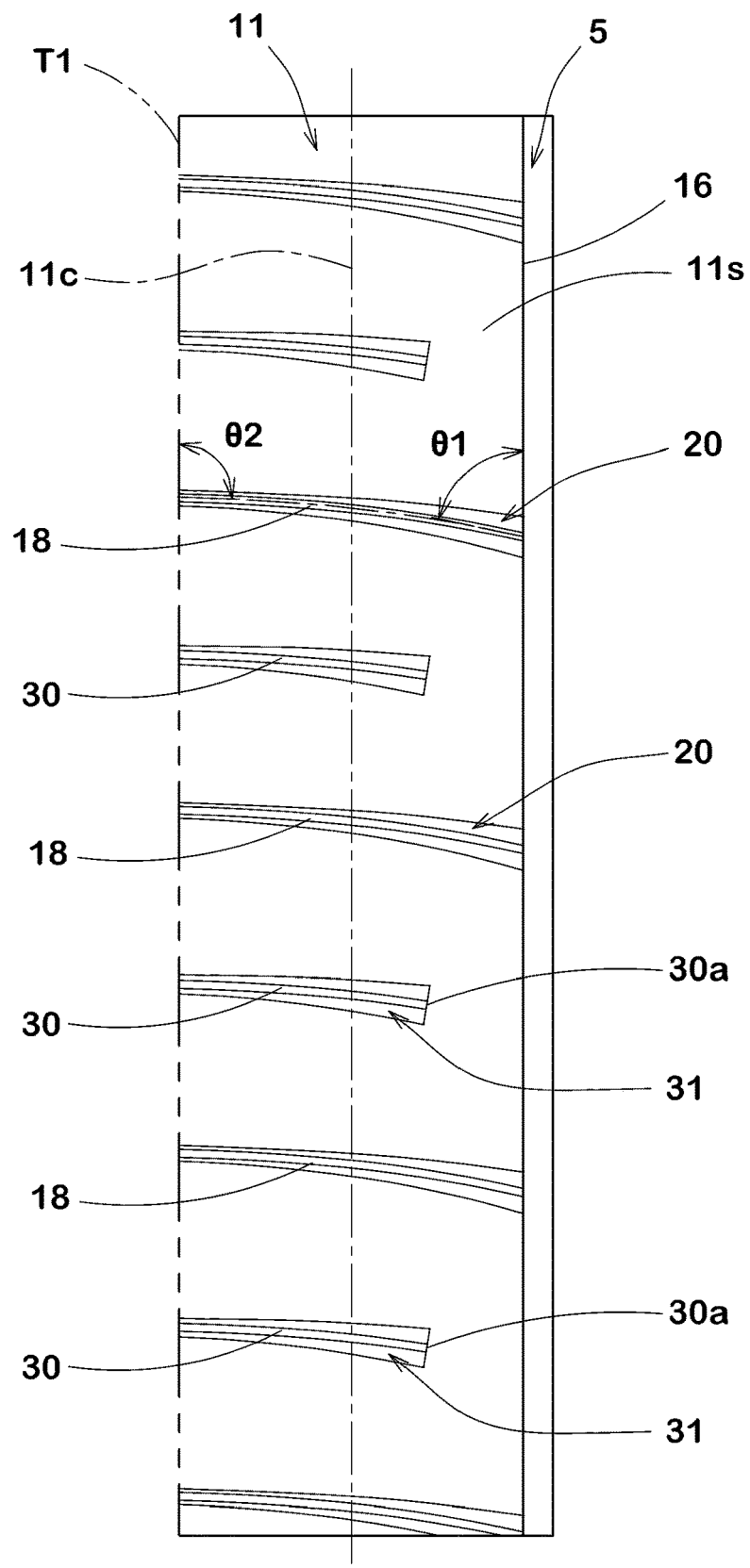
FIG. 2 is an enlarged view of a first shoulder land region of FIG. 1.

FIG. 2 shows an enlarged view of the first shoulder land region 11. As shown in FIG. 2, the first shoulder land region 11 includes a first longitudinal edge 16 located on the first shoulder circumferential groove 5 side and a shoulder center position (11c), which is the center position in the tire axial direction between the first longitudinal edge 16 and the first tread edge T1. Further, the first shoulder land region 11 is provided with a plurality of first shoulder sipes 18 extending from the first longitudinal edge 16 to at least the first tread edge T1.

In the present specification, the term "sipe" means a groove-shaped body having a small width (a concept that includes grooves and sipes), where the width between the two inner walls is 2.0 mm or less in the area excluding chamfered portions, which will be described later. Further, the area excluding the chamfered portions means the area where the two inner walls extend in a tire radial direction parallel to each other. The term "parallel" means that an angle between the two inner walls is 10 degrees or less. The width between the two inner walls in the area excluding the chamfered portions is preferably 1.5 mm or less, and in a more preferred manner from 0.4 to 1.0 mm. Furthermore, an overall depth of each of the sipes is 3.0 mm or more and 5.5 mm or less, for example. In addition, the sipes may also have a so-called flask bottom with an increased width at the bottom. It should be noted that in the present specification, if one of the groove shaped bodies has a portion with the width exceeding 2.0 mm over more than 50% of the overall depth thereof, the one of the groove shaped bodies shall be regarded as a groove.

Figure 3:
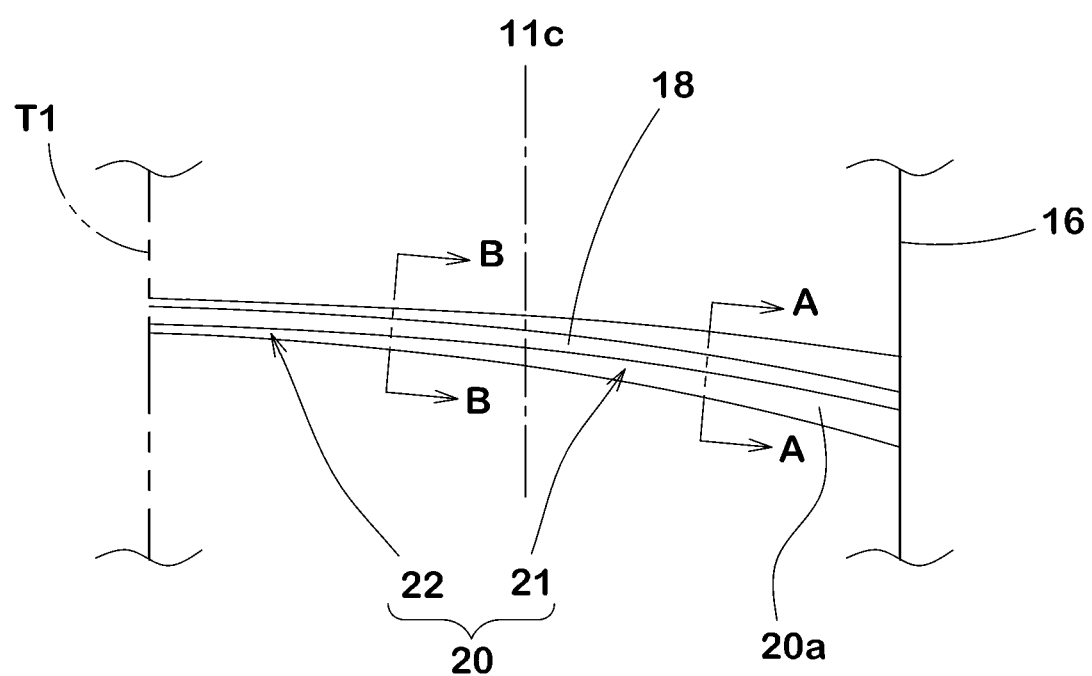
FIG. 3 is an enlarged view of one of the first shoulder sipes of FIG. 2.
Figure 4:
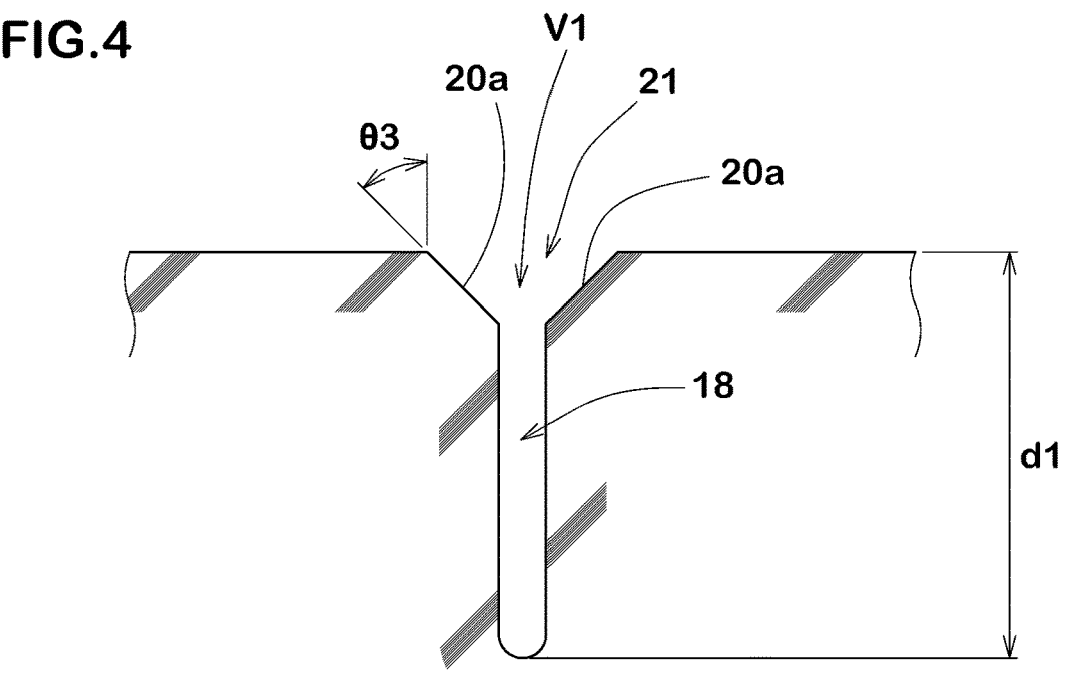
FIG. 4 is a cross-sectional view taken along A-A line of FIG. 3.
Figure 5:
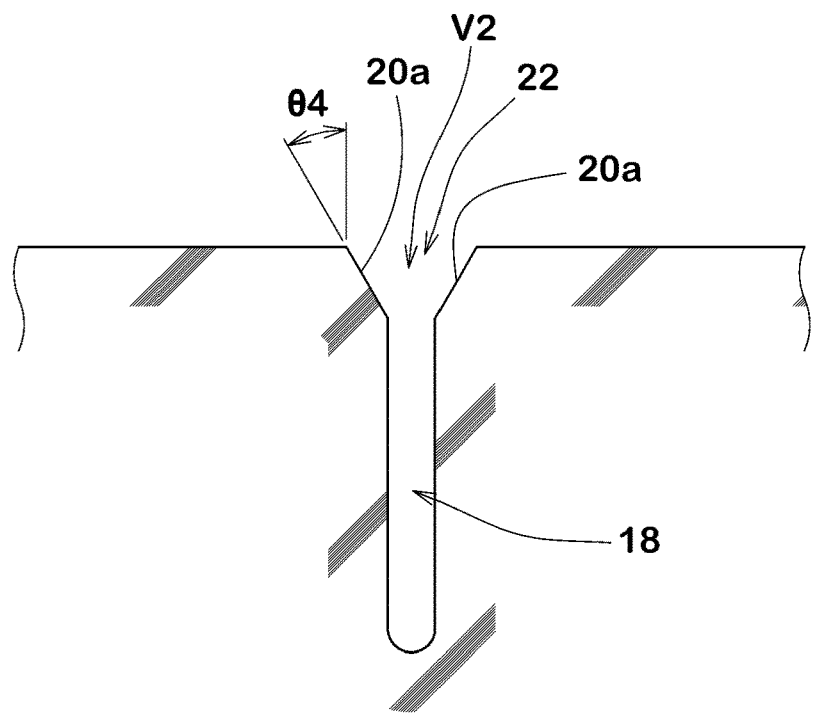
FIG. 5 is a cross-sectional view taken along B-B line of FIG. 3.

FIG. 3 shows an enlarged view of one of the first shoulder sipes 18. FIG. 4 shows a cross-sectional view taken along A-A line of FIG. 3. FIG. 5 shows a cross-sectional view taken along B-B line of FIG. 3. As shown in FIGS. 3 to 5, each of the first shoulder sipes 18 in the present disclosure has a chamfered portion 20 in the entire lengthwise range from the first longitudinal edge 16 to the first tread edge T1. In the present embodiment, the chamfered portion 20 is formed by sloped surfaces (20a) provided in both of the two sipe walls, but the chamfered portion 20 of the present disclosure may also be formed by the sloped surface (20a) provided in only one of the two sipe walls.

Each of the chamfered portions 20 includes a first chamfered portion 21 demarcated between the shoulder center position (11c) and the first longitudinal edge 16 and a second chamfered portion 22 demarcated between the shoulder center position (11c) and the first tread edge T1. In the present disclosure, the second chamfered portion 22 has a chamfer volume V2 smaller than a chamfer volume V1 of the first chamfered portion 21. By adopting the above configuration, it is possible that the tire 1 of the present disclosure improves the cornering performance while suppressing the deterioration of the noise performance. The mechanism is as follows.

Figure 6:
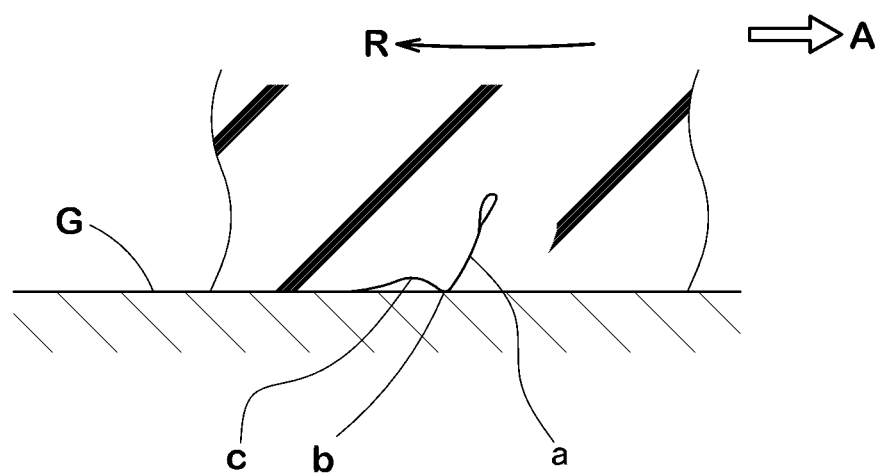
FIG. 6 is an enlarged cross-sectional view of a conventional sipe in a state of contacting a road surface.

FIG. 6 shows an enlarged cross-sectional view of a conventional sipe (a) without a chamfered portion in a state of contacting a road surface (G). FIG. 6 shows a state during braking, with an arrow (R) indicating a tire rotational direction and an arrow (A) indicating a tire running direction. As shown in FIG. 6, in general, when a large shearing force (braking force in FIG. 6) is applied around the sipe (a) without the chamfered portion, such as during braking or cornering, an edge (b) of the sipe (a) is pulled inside a ground contacting surface of the land region, and eventually a surface (c) of the land region in the vicinity thereof is locally lifted from the road surface, and thus sufficient grip may not be exerted. Conventionally, this tends to impair braking performance and the cornering performance.

As shown in FIG. 3, in the present disclosure, each of the first shoulder sipes 18 is provided with the chamfered portion 20 throughout the entire lengthwise range from the first longitudinal edge 16 to the first tread edge T1. Therefore, it is possible that the tire 1 of the present disclosure suppresses the above-described problems and improves the braking performance and the cornering performance. Further, in the present disclosure, since the chamfer volume V1 of the first chamfered portion 21 is relatively large, a sufficient size of the chamfered portion can be secured on the first longitudinal edge 16 side of the first shoulder land region 11. As a result, in the formation range of the first chamfered portion 21 of the first shoulder sipes 18, a ground contacting property is further improved, therefore, the cornering performance can be expected to be further improved.

Further, in general, as the chamfer volume of a sipe increases, running noise (pumping noise, for example) caused by the increase in the sipe volume tends to increase. In the present disclosure, the relatively small chamfer volume V2 of the second chamfered portion 22 can suppress an increase in noise due to the increase in the sipe volume because of the chamfered portion 20, thereby, it is possible that the deterioration of the noise performance is suppressed.

Figure 7:
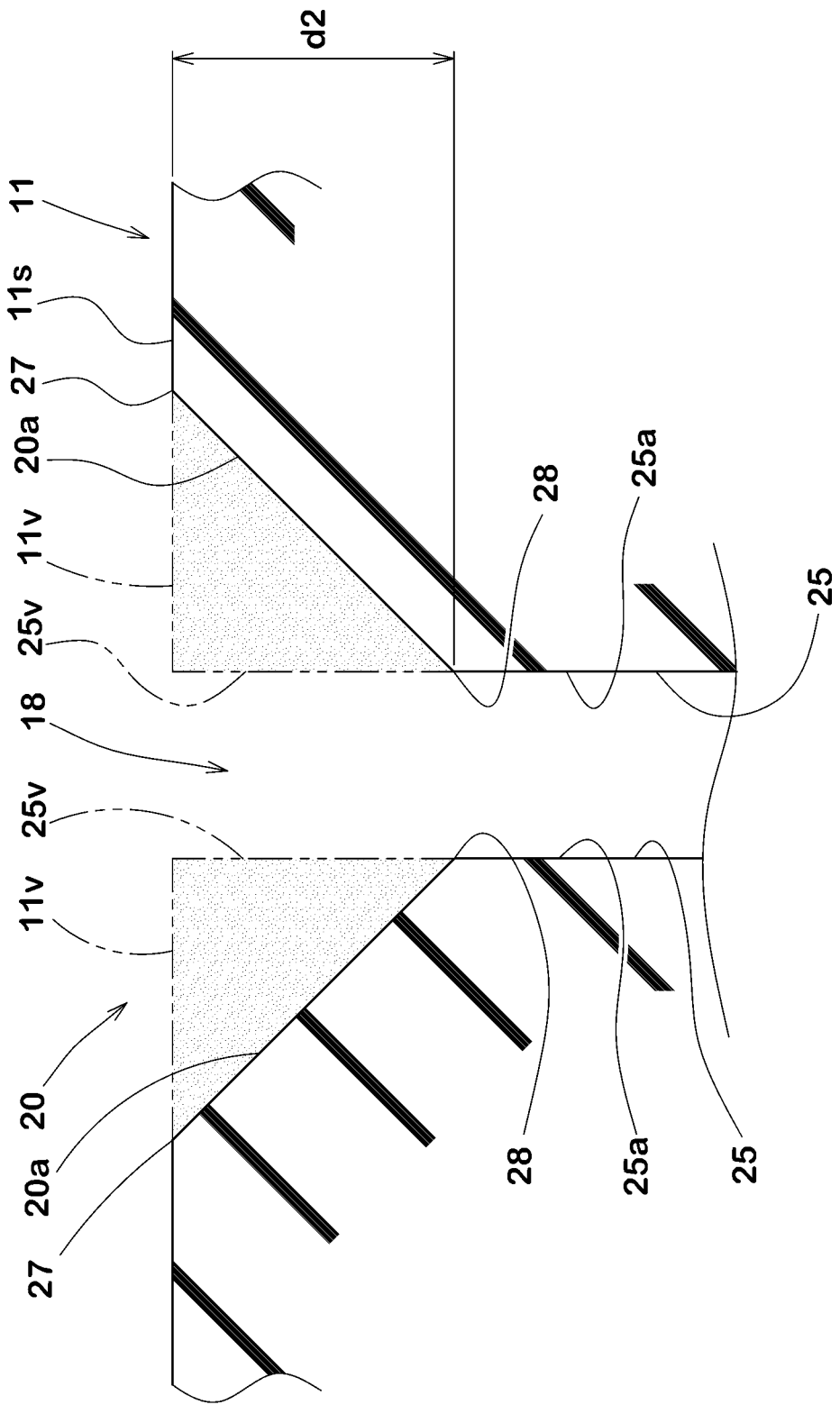
FIG. 7 is an enlarged cross-sectional view of the chamfered portion of FIG. 4.

FIG. 7 shows an enlarged cross-sectional view of one of the chamfered portions 20. As shown in FIG. 7, each of the chamfered portions 20 in the present embodiment includes the sloped surfaces (20a) each inclined to connect a main body (25a) of a respective one of sipe walls 25 with a ground contacting surface (11s) of the first shoulder land region 11 so that sharp corners are not formed between the sipe walls 25 of each of the first shoulder sipes 18 and the ground contacting surface (11s) of the first shoulder land region 11. Each of the sloped surfaces (20a) in the present embodiment is planar (that is, straight in the lateral cross-section of the sipe), but each of the sloped surfaces (20a) may be smoothly curved so as to be convex radially outward, or may have a plurality of micro planar surfaces between the main body (25a) and the ground contacting surface (11s), or may be a combination of a micro-plane (or micro planes) and a micro-curved surface (or micro-curved surfaces) between the main body (25a) and the ground contacting surface (11s). Further, an opening width of each of the chamfered portions 20 may exceed 2.0 mm, for example. Each of the chamfered portions 20 has a depth (d2) of 10% or more and 40% or less of an overall depth (d1) (shown in FIG. 4) of each of the first shoulder sipes 18, for example.

The chamfer volume is defined as follows. That is, in the case that each of the first shoulder sipes 18 has the chamfered portion on one of the sipe walls thereof, the chamfer volume is the volume of the portion surrounded by a virtual ground contacting surface (11v) and a virtual sipe wall (25v). The virtual ground contacting surface (11v) is obtained by extending the ground contacting surface (11s) of the first shoulder land region 11 in a direction of the opening width of the first shoulder sipe 18. The virtual sipe wall (25v) is obtained by extending the main body (25a) of the sipe wall 25 to the virtual ground contacting surface (11v). In the case that both of the two sipe walls 25 have the sloped surfaces (20a) as shown in FIG. 7, the chamfer volume is the sum of the volumes of the two portions shaded with dots.

Each of the sloped surfaces (20a) of the chamfered portion 20 means a surface from the main body (25a) of a respective one of the sipe walls 25 to the ground contacting surface (11s) of the first shoulder land region 11. It should be noted that, when the tire 1 in the standard state is in contact with a flat surface with zero camber angle by being loaded with 60% of the standard tire load, an edge of the outer surface of the first shoulder land region 11 contacting the plane is a boundary 27 between each of the sloped surfaces (20a) and the ground contacting surface (11s). The virtual ground contacting surface (11v) is a virtual surface obtained by extending the ground contacting surface (11s) from the boundary 27 in the opening width direction of the sipe. If the ground contacting surface is curved, in a cross-sectional view of each of the first shoulder sipes 18, the virtual ground contacting surface (11v) corresponds to a curved line extending from the boundary 27 while maintaining the curvature of the ground contacting surface (11s).

The virtual sipe wall (25v) is a virtual surface obtained by extending the main body (25a) of each of the sipe walls 25 from a boundary 28 between the main body (25a) and a respective one of the sloped surfaces (20a) to the virtual ground contacting surface (11v). The boundary 28 between the main body (25a) of each of the sipe walls 25 and a respective one of the sloped surfaces (20a) is a location where the angle of the sipe wall 25 with respect to the tire radial direction changes abruptly. It should be noted that if the location where the angle changes abruptly is a region having a substantial width, the position closest to the groove centerline corresponds to the boundary 28.

A more detailed configuration of the present embodiment will be described below. It should be noted that each of the configurations described below is a specific form of the present embodiment. Therefore, it goes without saying that the present disclosure can achieve the effects described above even if it does not have the configurations described below. Further, even if any one of the configurations described below is applied alone to the tire of the present disclosure with the features described above, improvement in performance can be expected according to each configuration. Furthermore, when some of the configurations described below are applied in combination, a combined improvement in performance can be expected according to the combined configurations.

As shown in FIG. 2, the ground contacting surface (11s) of the first shoulder land region 11 in the present embodiment is provided with only sipes and not provided with grooves between the first longitudinal edge 16 and the first tread edge T1. Thereby, the cornering performance is further improved. However, the present disclosure is not limited to such an aspect, and the ground contacting surface (11s) of the first shoulder land region 11 may be provided with grooves.

It is preferred that an angle of each of the first shoulder sipes 18 (an angle on the acute angle side) with respect to the tire circumferential direction increases continuously from the first longitudinal edge 16 to the first tread edge T1. Therefore, the cornering performance and the breaking performance are improved in a good balance.

At the first longitudinal edge 16, an angle $\theta 1$ of each of the first shoulder sipes 18 with respect to the tire circumferential direction is preferably 30 degrees or more, more preferably 50 degrees or more, still more preferably 60 degrees or more, and preferably 80 degrees or less, more preferably 70 degrees or less. In the embodiment shown in FIG. 2, the angle $\theta 1$ is about 70 to 80 degrees, but the angle $\theta 1$ is not limited to this, and may be from 30 to 70 degrees in another embodiment. The first shoulder sipes 18 configured as such can provide a large frictional force in the tire axial direction on the first longitudinal edge 16 side, therefore, it is possible that the cornering performance is further improved. On the other hand, at the first tread edge T1, an angle θ2 of each of the first shoulder sipes 18 with respect to the tire circumferential direction is 60 degrees or more and 90 degrees or less, and preferably 80 degrees or more and 90 degrees or less, for example.

As shown in FIG. 3, each of the chamfered portions 20 has a cross-sectional area taken perpendicular to a longitudinal direction of the sipe and increasing (continuously in the present embodiment) axially inward. In each of the chamfered portions 20 of the present embodiment, the cross-sectional area increases continuously from the first tread edge T1 to the first longitudinal edge 16. As a result, uneven wear around the first shoulder sipes 18 is suppressed.

From the point of view of improving the noise performance and the cornering performance in a good balance, the chamfer volume V2 of each of the second chamfered portions 22 is preferably 20% or more, more preferably 30% or more, even more preferably 40% or more, and preferably 70% or less, more preferably 60% or less, even more preferably 50% or less of the chamfer volume V1 of each of the first chamfered portions 21.

As shown in FIGS. 4 and 5, each of the two sipe walls 25 in the present embodiment includes a sloped surface (20a), therefore, each of the chamfered portions 20 includes two sloped surfaces (20a) and these two sloped surfaces (20a) have a symmetrical shape with respect to a sipe centerline in a cross section of the sipe. However, the sloped surfaces (20a) are not limited to such a mode, and these two sloped surfaces (20a) may have different shapes from each other, for example.

Each of the sloped surfaces (20a) has an angle of 20 degrees or more and 70 degrees or less with respect to the tire radial direction, for example. Further, each of the sloped surfaces (20a) in the first chamfered portion 21 has an angle θ3 with respect to the tire radial direction larger than an angle θ4 of each of the sloped surfaces (20a) in the second chamfered portion 22 with respect to the tire radial direction. Thereby, it is possible that the cornering performance is further improved.

As shown in FIG. 2, the first shoulder land region 11 in the present embodiment is provided with a plurality of shoulder terminating sipes 30. Each of the shoulder terminating sipes 30 extends at least from the first tread edge T1 toward the first longitudinal edge 16 and has a terminating end (30a) as a closed end not connected with other sipes and grooves in the ground contacting surface (11s) of the first shoulder land region 11. Each of the shoulder terminating sipes 30 is formed with a chamfered portion 31 over the entire lengthwise range thereof from the first tread edge T1 to the terminating end (30a). Further, the chamfered portion 31 of each of the shoulder terminating sipes 30 has a cross-sectional area taken perpendicular to a longitudinal direction of the sipe and continuously increasing from the first tread edge T1 to the terminating end (30a). It is possible that the shoulder terminating sipes 30 configured as such, together with the first shoulder sipes 18 described above, improve the cornering performance while suppressing deterioration of the noise performance.

Figure 8:
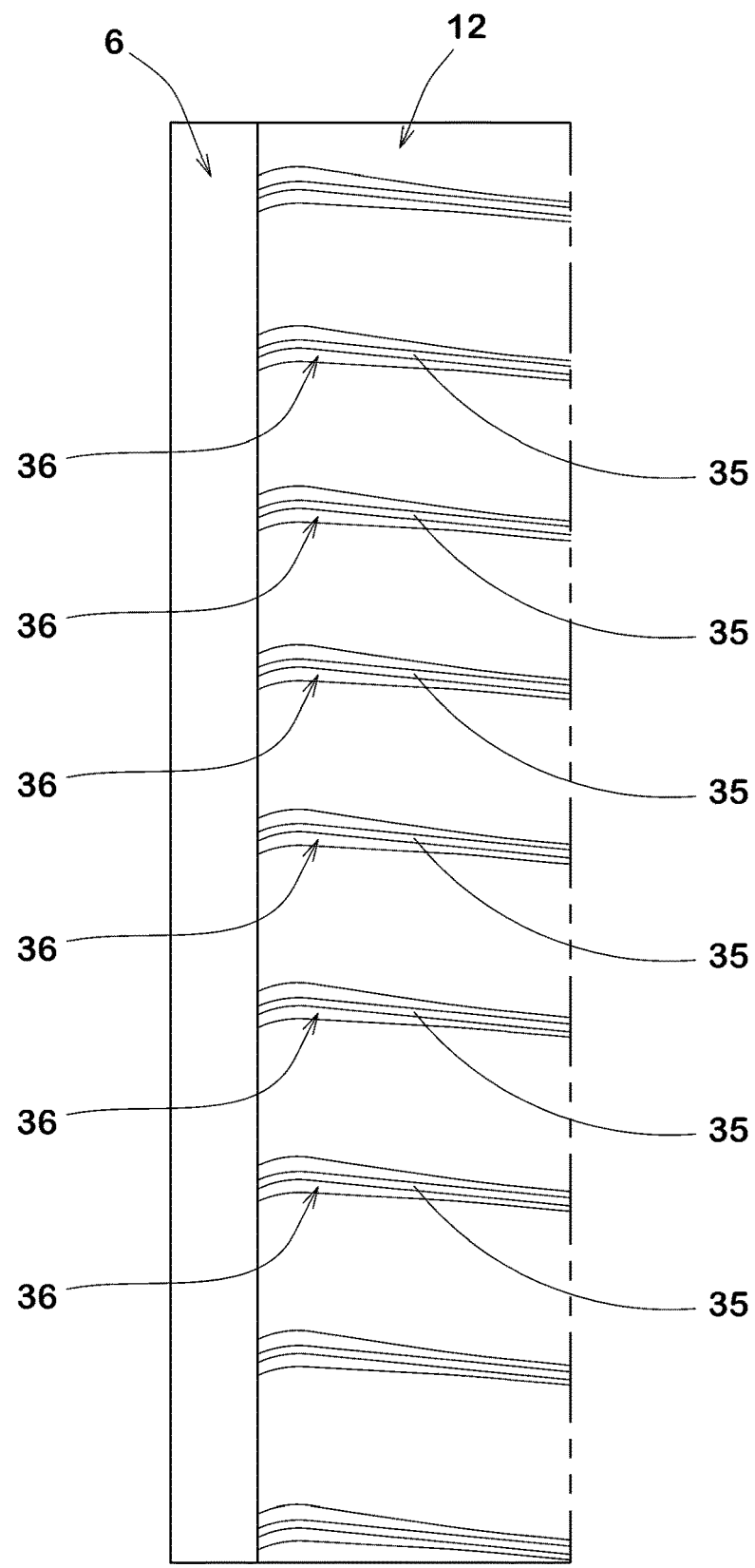
FIG. 8 is an enlarged view of a second shoulder land region of FIG. 1.

FIG. 8 shows an enlarged view of the second shoulder land region 12. The second shoulder land region 12 in the present embodiment is provided with a plurality of second shoulder sipes 35. Each of the second shoulder sipes 35 extends from the second tread edge T2 to the second shoulder circumferential groove 6. Each of the second shoulder sipes 35 has a chamfered portion 36 formed over the entire lengthwise range from the second shoulder circumferential groove 6 to the second tread edge T2.

The configuration of the chamfered portions 20 of the first shoulder sipes 18 described above can be applied to the chamfered portions 36 of the second shoulder sipes 35, and the description here is omitted. By including the second shoulder sipes 35 configured as such, the tire 1 of the present embodiment can further enhance the above-described effects.

Figure 9:
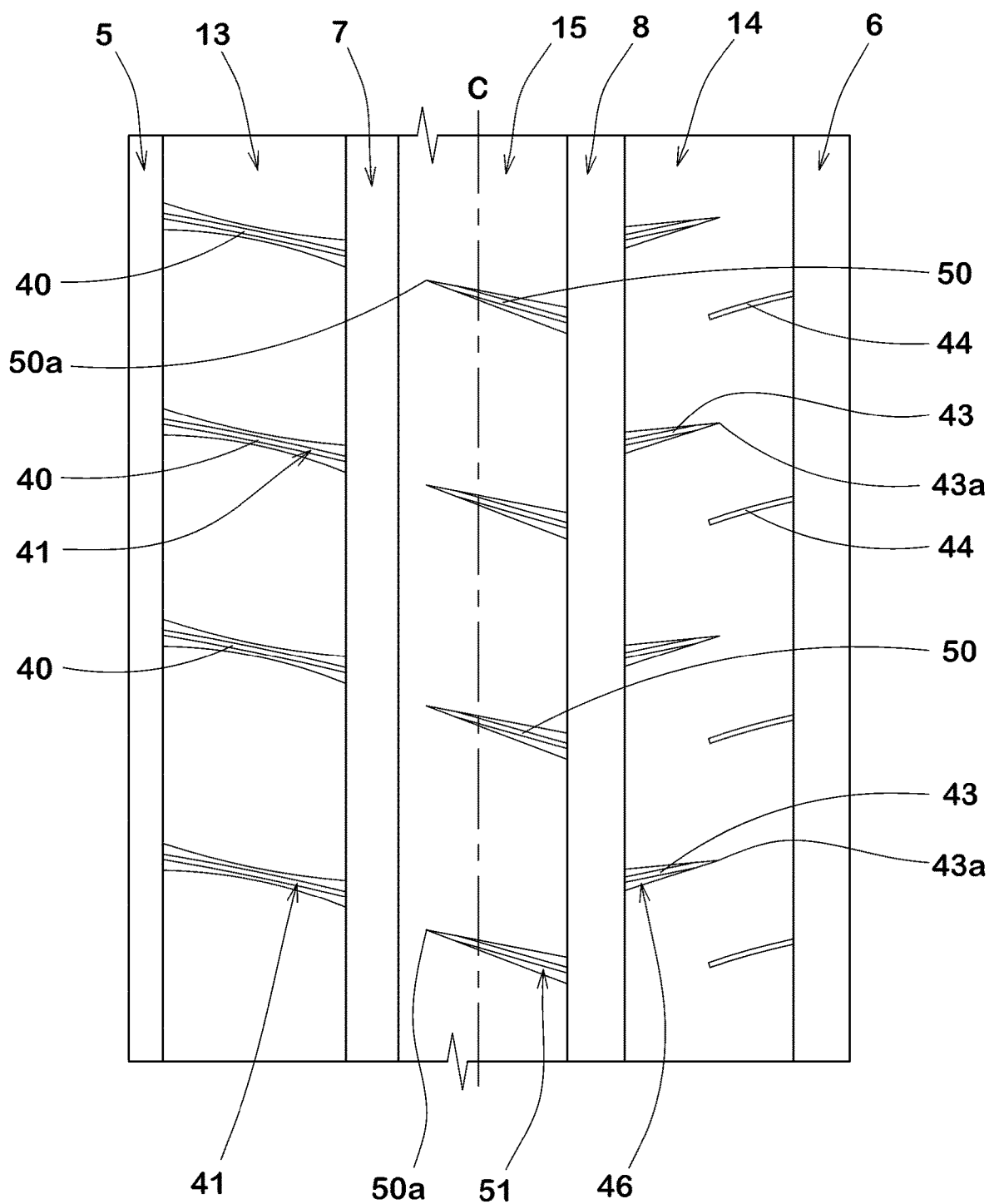
FIG. 9 is an enlarged view of a first middle land region, a second middle land region, and a crown land region of FIG. 1.

FIG. 9 shows an enlarged view of the first middle land region 13, the second middle land region 14, and the crown land region 15. As shown in FIG. 9, the first middle land region 13 is provided with first middle sipes 40 each completely crossing the ground contacting surface of the first middle land region 13 in the tire axial direction. Further, each of the first middle sipes 40 is formed with a chamfered portion 41 over the entire lengthwise range thereof. In a more preferred embodiment, the chamfered portion 41 of each of the first middle sipes 40 has a cross-sectional area taken perpendicular to a longitudinal direction of the sipe and continuously increasing from an axial center of the sipe toward both sides in the tire axial direction. It is possible that the first middle sipes 40 configured as such, together with the above-mentioned first shoulder sipes 18, improve the cornering performance and the braking performance in a good balance.

The second middle land region 14 is provided with a plurality of outer second middle sipes 43 and a plurality of inner second middle sipes 44. Each of the outer second middle sipes 43 extends axially outward from the second crown circumferential groove 8 to have a terminating end (43a) as a closed end not connected with other sipes and grooves in the ground contacting surface of the second middle land region 14. Each of the inner second middle sipes 44 extends axially inward from the second shoulder circumferential groove 6 to have a closed terminating end not connected with other sipes and grooves in the ground contacting surface of the second middle land region 14.

Each of the outer second middle sipes 43 is formed with a chamfered portion 46 over the entire lengthwise range thereof. The chamfered portion 46 of each of the outer second middle sipes 43 has a cross-sectional area taken perpendicular to a longitudinal direction of the sipe and decreasing (continuously in the present embodiment) from the second crown circumferential groove 8 toward the terminating end (43a). On the other hand, the inner second middle sipes 44 are not chamfered. It is possible that the outer second middle sipes 43 and the inner second middle sipes 44 configured as such improve the braking performance while suppressing the uneven wear in the land region.

The crown land region 15 is provided with a plurality of crown sipes 50. Each of the crown sipes 50 extends from the second crown circumferential groove 8 toward the tire equator (C) to have a terminating end (50a) as a closed end not connected with other sipes and grooves within a ground contacting surface (15s) of the crown land region 15, for example. Moreover, each of the crown sipes 50 is provided with a chamfered portion 51 over the entire lengthwise range thereof. The chamfered portion 51 of each of the crown sipes 50 has a cross-sectional area taken perpendicular to a longitudinal direction of the sipe and decreasing (continuously in the present embodiment) from the second crown circumferential groove 8 toward the terminating end (50a). It is possible that the crown sipes 50 configured as such improve the braking performance while suppressing the uneven wear in the land region.

As shown in FIG. 1, each of the land regions of the present embodiment is provided with only sipes and is not provided with a groove. Thereby, the cornering performance and the braking performance are still further improved.

While detailed description has been made of the tire according to an embodiment of the present disclosure, the present disclosure can be embodied in various forms without being limited to the illustrated embodiment.

STATEMENT OF DISCLOSURE

The present disclosure includes the following aspects.
[Present Disclosure 1]
  A tire having a tread portion comprising:
  a first tread edge;
  a plurality of circumferential grooves extending continuously in a tire circumferential direction; and
  a first shoulder land region, wherein
  the circumferential grooves include a first shoulder circumferential groove extending continuously in the tire circumferential direction closest to the first tread edge among the circumferential grooves,
  the first shoulder land region is demarcated outside the first shoulder circumferential groove in a tire axial direction and includes a first longitudinal edge located on the first shoulder circumferential groove side and a shoulder center position,
  the shoulder center position is a center position in the tire axial direction between the first longitudinal edge and the first tread edge,
  the first shoulder land region is provided with a plurality of first shoulder sipes extending from the first longitudinal edge to at least the first tread edge,
  each of the first shoulder sipes is provided with a chamfered portion in an entire lengthwise range from the first longitudinal edge to the first tread edge,
  each of the chamfered portions includes a first chamfered portion defined between the shoulder center position and the first longitudinal edge and a second chamfered portion defined between the shoulder center position and the first tread edge, and
  the second chamfered portion has a chamfer volume (V2) smaller than a chamfer volume (V1) of the first chamfered portion.
[Present Disclosure 2]
  The tire according to Present Disclosure 1, wherein the chamfer volume (V2) of the second chamfered portion is 20% or more and 70% or less of the chamfer volume (V1) of the first chamfered portion.
[Present Disclosure 3]
  The tire according to Present Disclosure 1 or 2, wherein each of the first shoulder sipes has an angle with respect to the tire circumferential direction increasing continuously from the first longitudinal edge to the first tread edge.
[Present Disclosure 4]
  The tire according to any one of Present Disclosures 1 to 3, wherein each of the first shoulder sipes has an angle of 30 degrees or more and 70 degrees or less with respect to the tire circumferential direction at the first longitudinal edge.
[Present Disclosure 5]
  The tire according to any one of Present Disclosures 1 to 4, wherein each of the first shoulder sipes has an angle of 80 degrees or more and 90 degrees or less with respect to the tire circumferential direction at the first tread edge.
[Present Disclosure 6]
  The tire according to any one of Present Disclosures 1 to 5, wherein a ground contacting surface of the first shoulder land region is provided with only sipes between the first longitudinal edge and the first tread edge.

DESCRIPTION OF REFERENCE SIGNS 2 tread portion
5 first shoulder circumferential groove
11 first shoulder land region
11c shoulder center position
16 first longitudinal edge
18 first shoulder sipe
20 chamfered portion
21 first chamfered portion
22 second chamfered portion
T1 first tread edge
V1 chamfer volume of first chamfered portion
V2 chamfer volume of second chamfered portion

The invention claimed is:
1. A tire having a tread portion comprising:
a first tread edge;
a plurality of circumferential grooves extending continuously in a tire circumferential direction; and
a first shoulder land region, wherein
the circumferential grooves include a first shoulder circumferential groove extending continuously in the tire circumferential direction closest to the first tread edge among the circumferential grooves,
the first shoulder land region is demarcated outside the first shoulder circumferential groove in a tire axial direction and includes a first longitudinal edge located on the first shoulder circumferential groove side and a shoulder center position,
the shoulder center position is a center position in the tire axial direction between the first longitudinal edge and the first tread edge,
the first shoulder land region is provided with a plurality of first shoulder sipes extending from the first longitudinal edge to at least the first tread edge,
each of the first shoulder sipes is provided with a chamfered portion over an entire lengthwise range from the first longitudinal edge to the first tread edge,
each of the chamfered portions includes a first chamfered portion defined between the shoulder center position and the first longitudinal edge and a second chamfered portion defined between the shoulder center position and the first tread edge,
the second chamfered portion has a chamfer volume (V2) smaller than a chamfer volume (V1) of the first chamfered portion,
the chamfered portion has a cross-sectional area increasing continuously from the first tread edge to the first longitudinal edge,
the first shoulder land region is provided with a plurality of shoulder terminating sipes,
each of the shoulder terminating sipes extends at least from the first tread edge toward the first longitudinal edge and terminates within the first shoulder land region to have a closed terminating end,
each of the shoulder terminating sipes is provided with a chamfered portion over an entire lengthwise range thereof, and
the chamfered portion of each of the shoulder terminating sipes has a cross-sectional area continuously increasing from the first tread edge to the closed terminating end thereof.

2. The tire according to claim 1, wherein the chamfer volume (V2) of the second chamfered portion is 20% or more and 70% or less of the chamfer volume (V1) of the first chamfered portion.

3. The tire according to claim 1, wherein each of the first shoulder sipes has an angle with respect to the tire circumferential direction increasing continuously from the first longitudinal edge to the first tread edge.

4. The tire according to claim 1, wherein each of the first shoulder sipes has an angle of 30 degrees or more and 70 degrees or less with respect to the tire circumferential direction at the first longitudinal edge.

5. The tire according to claim 1, wherein each of the first shoulder sipes has an angle of 80 degrees or more and 90 degrees or less with respect to the tire circumferential direction at the first tread edge.

6. The tire according to claim 1, wherein a ground contacting surface of the first shoulder land region is provided with only sipes between the first longitudinal edge and the first tread edge.

7. The tire according to claim 1, wherein
the tread portion includes a plurality of land regions demarcated by the circumferential grooves,
the land regions include the first shoulder land region, and
each of the land regions is provided with only sipes each having a width of 2.0 mm or less excluding the chamfered portion and not provided with a groove having a width larger than 2 mm excluding the chamfered portion.

8. The tire according to claim 1, wherein
each of sipe walls of the first shoulder sipes has a sloped surface and a main body,
the sloped surface is connected with a ground contacting surface of the first shoulder land region on an inner side in a tire radial direction and inclined with respect to the tire radial direction so as to form the chamfered portion,
the main body is connected with the sloped surface on the radially inner side and extends radially inward therefrom,
the sloped surface has an angle with respect to the tire radial direction larger in the first chamfered portion than in the second chamfered portion.

9. The tire according to claim 1, wherein the first shoulder sipes and the shoulder terminating sipes are arranged alternately one by one in the tire circumferential direction.

10. The tire according to claim 1, wherein
the tread portion includes a second tread edge opposite to the first tread edge,
the circumferential grooves include a second shoulder circumferential groove extending continuously in the tire circumferential direction closest to the second tread edge among the circumferential grooves,
the tread portion includes a second shoulder land region demarcated between the second shoulder circumferential groove and the second tread edge,
the second shoulder land region is provided with a plurality of second shoulder sipes, and
each of the second shoulder sipes extends in the tire axial direction from the second tread edge to the second shoulder circumferential groove.

11. The tire according to claim 10, wherein
each of the second shoulder sipes is provided with a chamfered portion over an entire lengthwise range from the second shoulder circumferential groove to the second tread edge, and
the chamfered portion of each of the second shoulder sipes has a cross-sectional area increasing from the second tread edge to the second shoulder circumferential groove.

12. The tire according to claim 10, wherein
the circumferential grooves include a first crown circumferential groove extending continuously in the tire circumferential direction between the first shoulder circumferential groove and a tire equator,
the tread portion includes a first middle land region demarcated between the first shoulder circumferential groove and the first crown circumferential groove,
the first middle land region is provided with first middle sipes each completely crossing the first middle land region in the tire axial direction, and
each of the first middle sipes is provided with a chamfered portion over an entire lengthwise range thereof.

13. The tire according to claim 12, wherein each of the first middle sipes has a cross-sectional area continuously increasing from an axial center of the each of the first middle sipes to both axial ends thereof.

14. The tire according to claim 12, wherein
the circumferential grooves include a second crown circumferential groove extending continuously in the tire circumferential direction between the second shoulder circumferential groove and the tire equator,
the tread portion includes a second middle land region demarcated between the second shoulder circumferential groove and the second crown circumferential groove,
the second middle land region is provided with a plurality of outer second middle sipes and a plurality of inner second middle sipes,
each of the outer second middle sipes extends axially outward from the second crown circumferential groove and terminates within the second middle land region to have a closed terminating end,
each of the inner second middle sipes extends axially inward from the second shoulder circumferential groove and terminates within the second middle land region to have a closed terminating end,
each of the outer second middle sipes is provided with a chamfered portion over an entire lengthwise range thereof, and
the inner second middle sipes are not chamfered.

15. The tire according to claim 14, wherein the chamfered portion of each of the outer second middle sipes has a cross-sectional area decreasing from the second crown circumferential groove to the closed terminating end of the each of the outer second middle sipes.

16. The tire according to claim 14, wherein
the tread portion includes a crown land region demarcated between the first crown circumferential groove and the second crown circumferential groove,
the crown land region is provided with a plurality of crown sipes,
each of the crown sipes extends from the second crown circumferential groove toward the tire equator and terminates within the crown land region to have a closed terminating end,
each of the crown sipes is provided with a chamfered portion over an entire lengthwise range thereof, and
the chamfered portion of each of the crown sipes has a cross-sectional area decreasing from the second crown circumferential groove to the closed terminating end of the each of the crown sipes.

17. The tire according to claim 1, wherein
each of the first shoulder sipes is provided with the chamfered portion on both circumferential sides thereof,
the chamfered portion of each of the first shoulder sipes has a sipe width continuously increasing in a same manner on both circumferential sides from the first tread edge to the first longitudinal edge.

18. The tire according to claim 1, wherein
each of the first shoulder sipes includes two inner walls extending parallel to each other in a tire radial direction,
a width between the two inner walls is 2.0 mm or less, and
the chamfered portion is formed by one or more sloped surfaces connecting a ground contacting surface of the first shoulder land region with one or both of the inner walls.

19. The tire according to claim 1, wherein
each of the first shoulder sipes includes two inner walls extending in a tire radial direction, and
the first shoulder sipes includes a flask bottom having a width between the two inner walls increased at the bottom.

* * * * *